United States Patent [19]

Harnden

[11] Patent Number: 5,092,028

[45] Date of Patent: Mar. 3, 1992

[54] APPARATUS FOR ASSEMBLY OF WOOD STRUCTURES

[75] Inventor: Charles W. Harnden, Fort Lauderdale, Fla.

[73] Assignee: Alpine Engineered Products, Inc., Pompano Beach, Fla.

[21] Appl. No.: 373,256

[22] Filed: Jun. 29, 1989

[51] Int. Cl.$^5$ .............................. B23P 21/00
[52] U.S. Cl. ........................... 29/709; 29/281.3; 29/281.5; 269/320; 269/910
[58] Field of Search ............. 29/468, 281.1, 281.3, 29/281.5, 709; 100/210, 913, 218, 100, 173; 227/152; 269/910, 320

[56] References Cited

U.S. PATENT DOCUMENTS

| | | | |
|---|---|---|---|
| 2,212,421 | 8/1940 | Henderson | 29/89 |
| 2,919,733 | 1/1960 | Johnson | 269/910 |
| 3,068,484 | 12/1962 | Moehlenpah et al. | 1/149 |
| 3,552,254 | 1/1971 | Marczy | 83/461 |
| 4,084,498 | 4/1978 | Weaver | 100/210 |
| 4,154,436 | 5/1979 | Sellers | 269/321 |
| 4,567,821 | 2/1986 | McDonald | 100/100 |
| 4,821,408 | 4/1989 | Speller, Sr. et al. | 29/701 |

Primary Examiner—Joseph M. Gorski
Assistant Examiner—S. Thomas Hughes
Attorney, Agent, or Firm—Oltman and Flynn

[57] ABSTRACT

An apparatus for assembling roof trusses including a multi-section assembly table with narrow, parallel, elongated openings in each section. Jig stops are individually adjustable along these openings by respective lead screws driven by stepper motors. The motors are controlled from a computer to automatically position the jig stops in accordance with a particular truss design. The apparatus has conveyor roller carriers between the sections of the assembly table which are raised to lift a completed truss up from the table, so that it can be slid off the table.

6 Claims, 9 Drawing Sheets

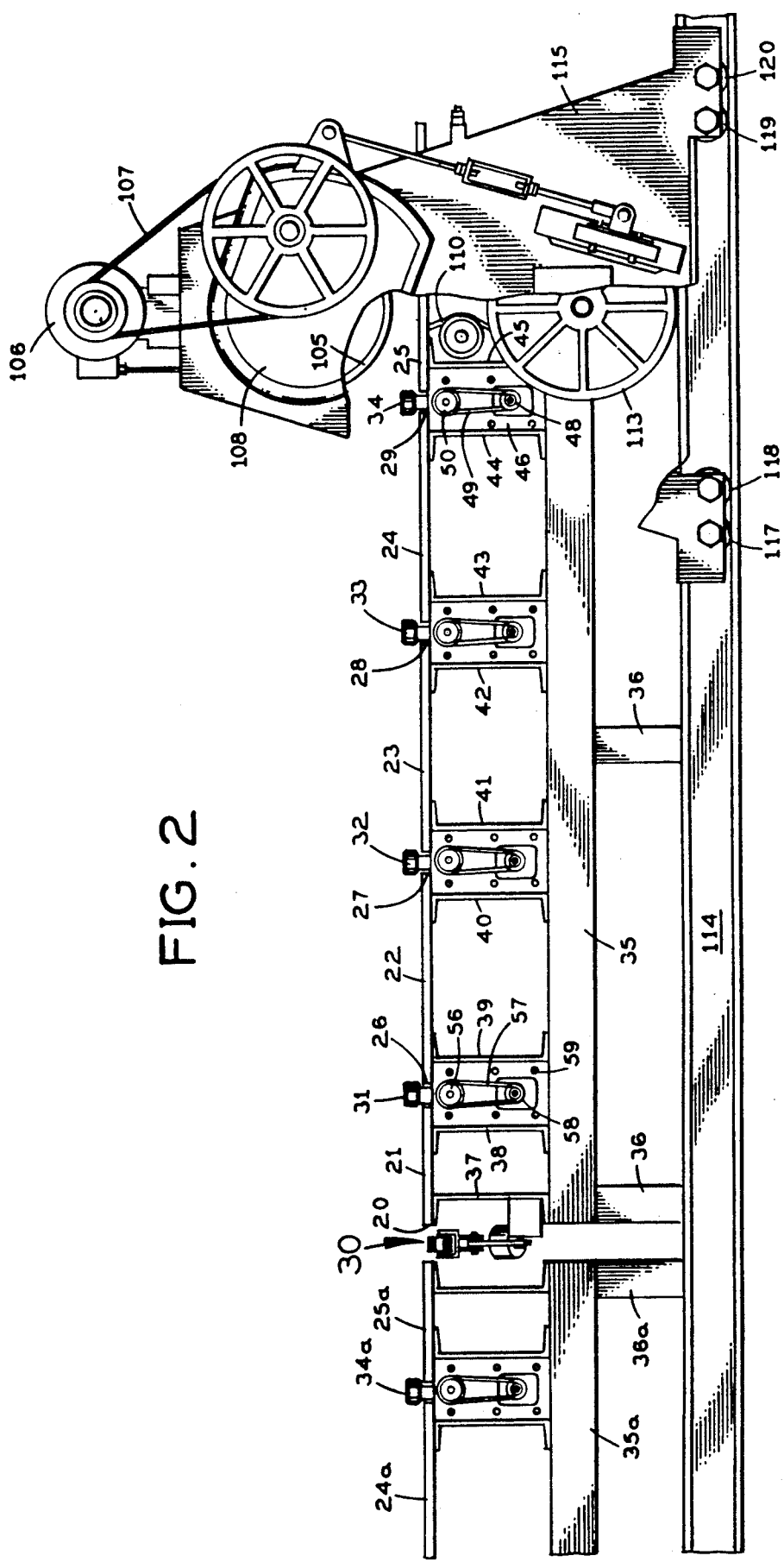

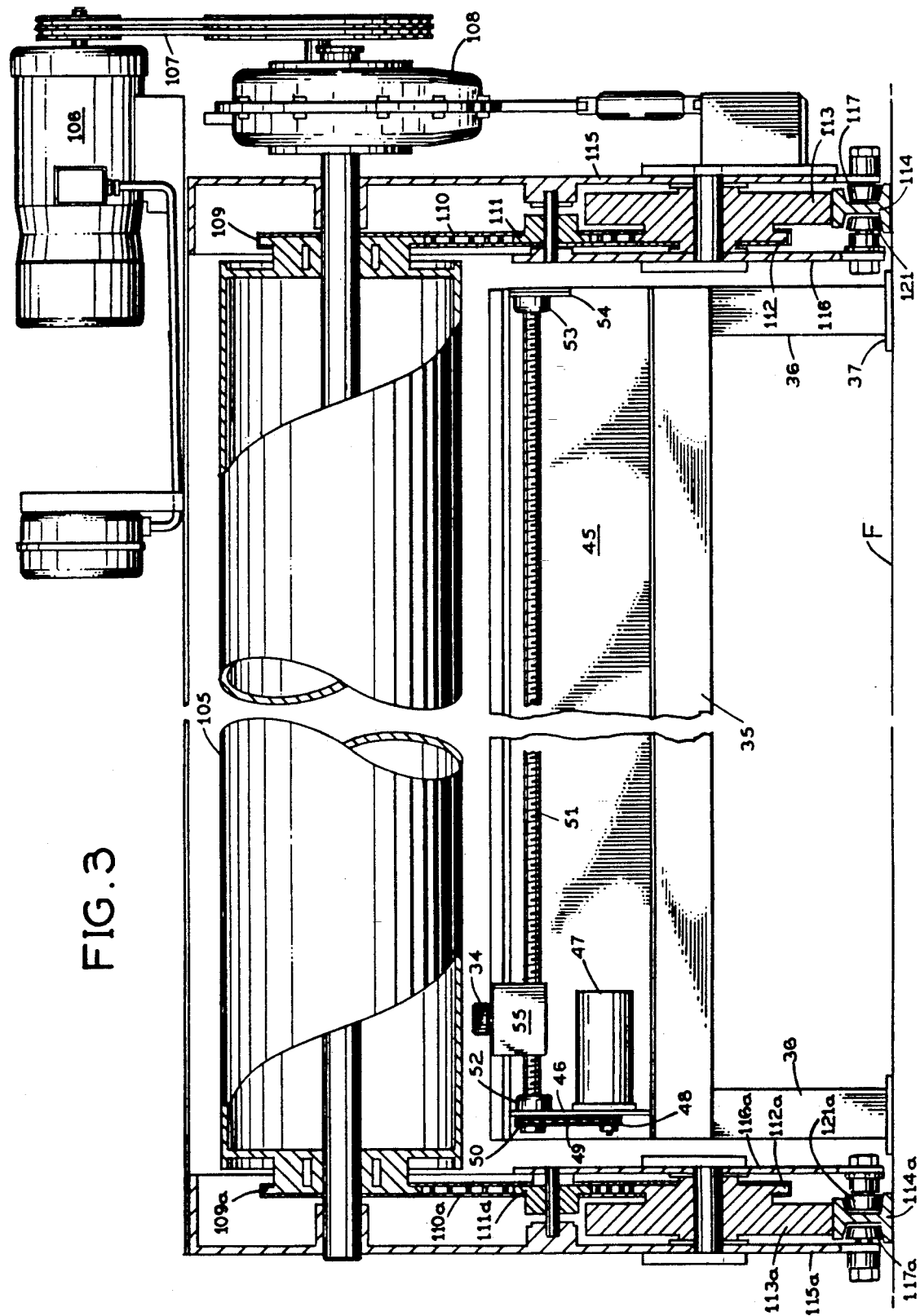

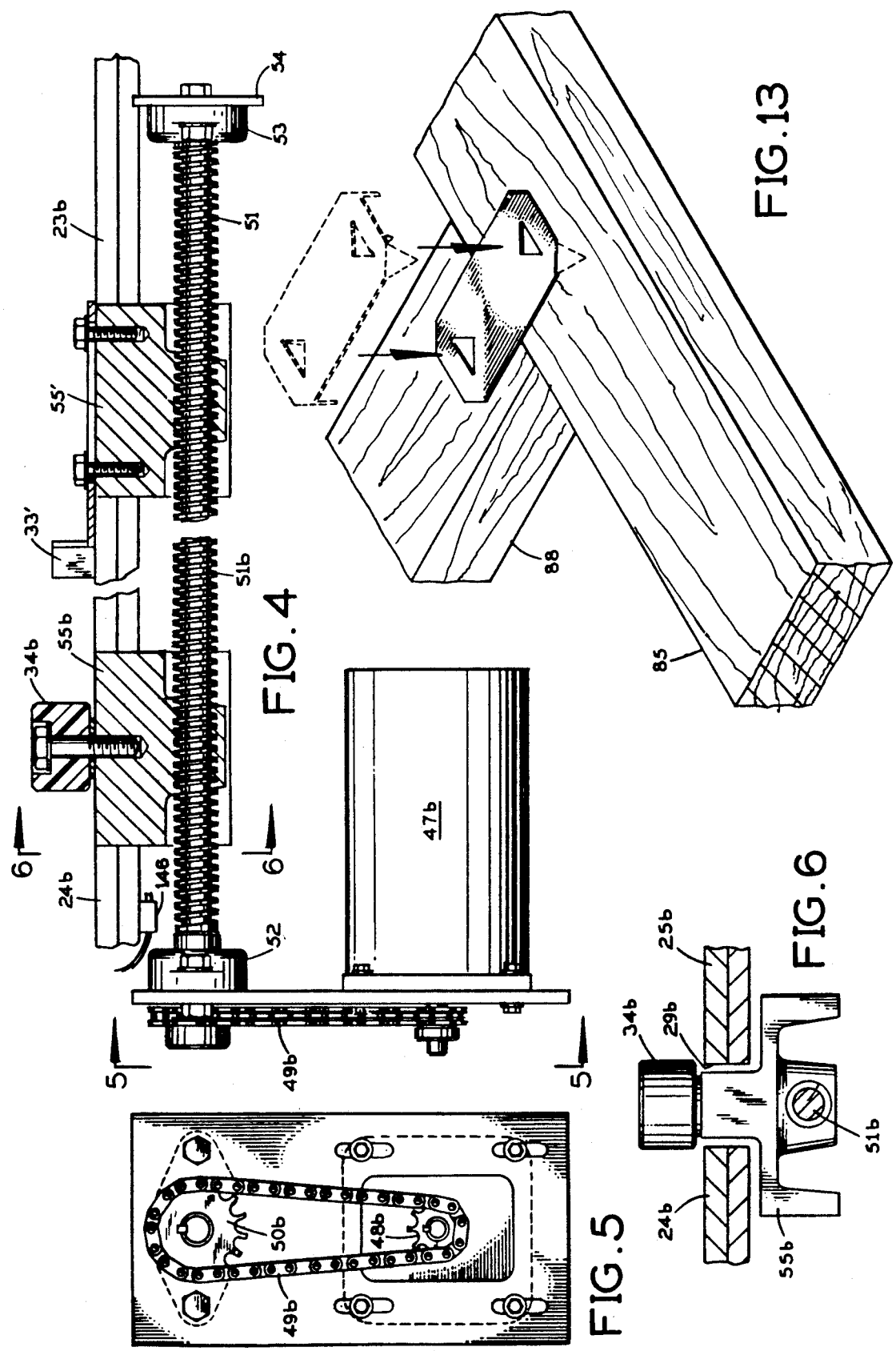

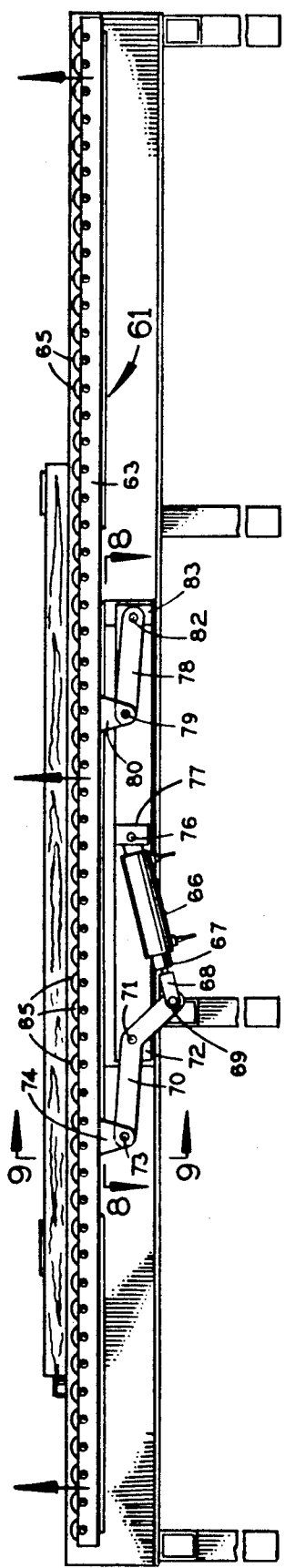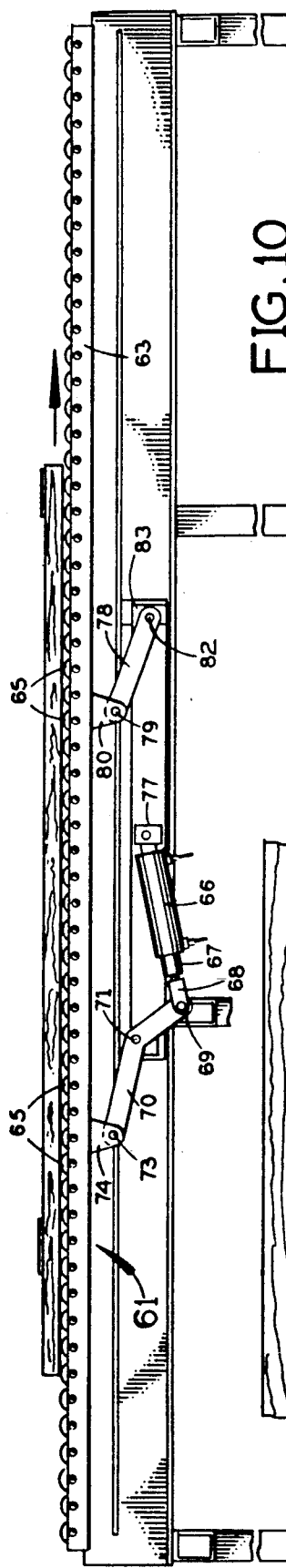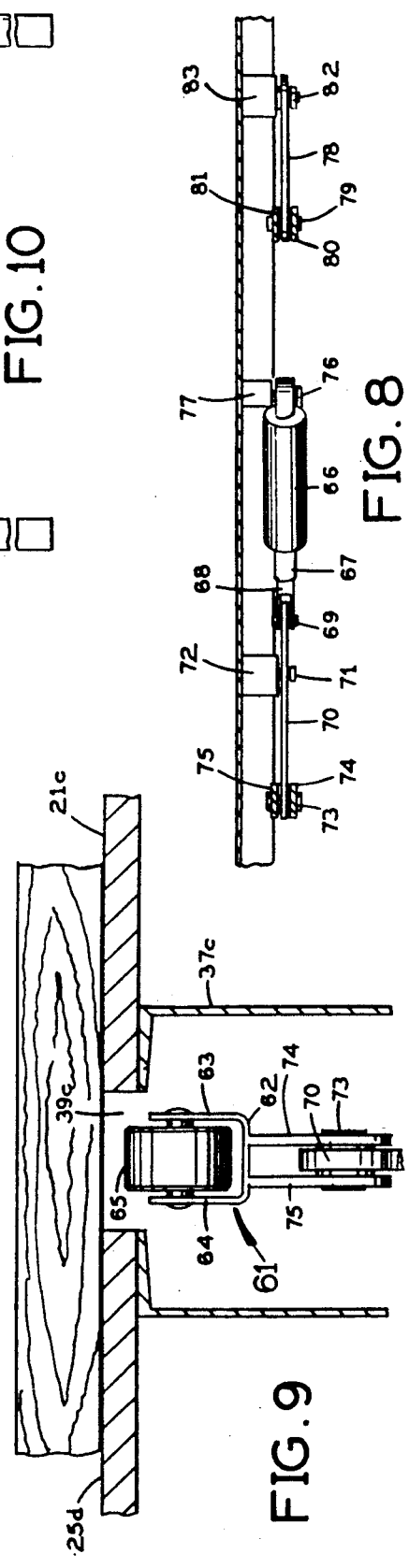

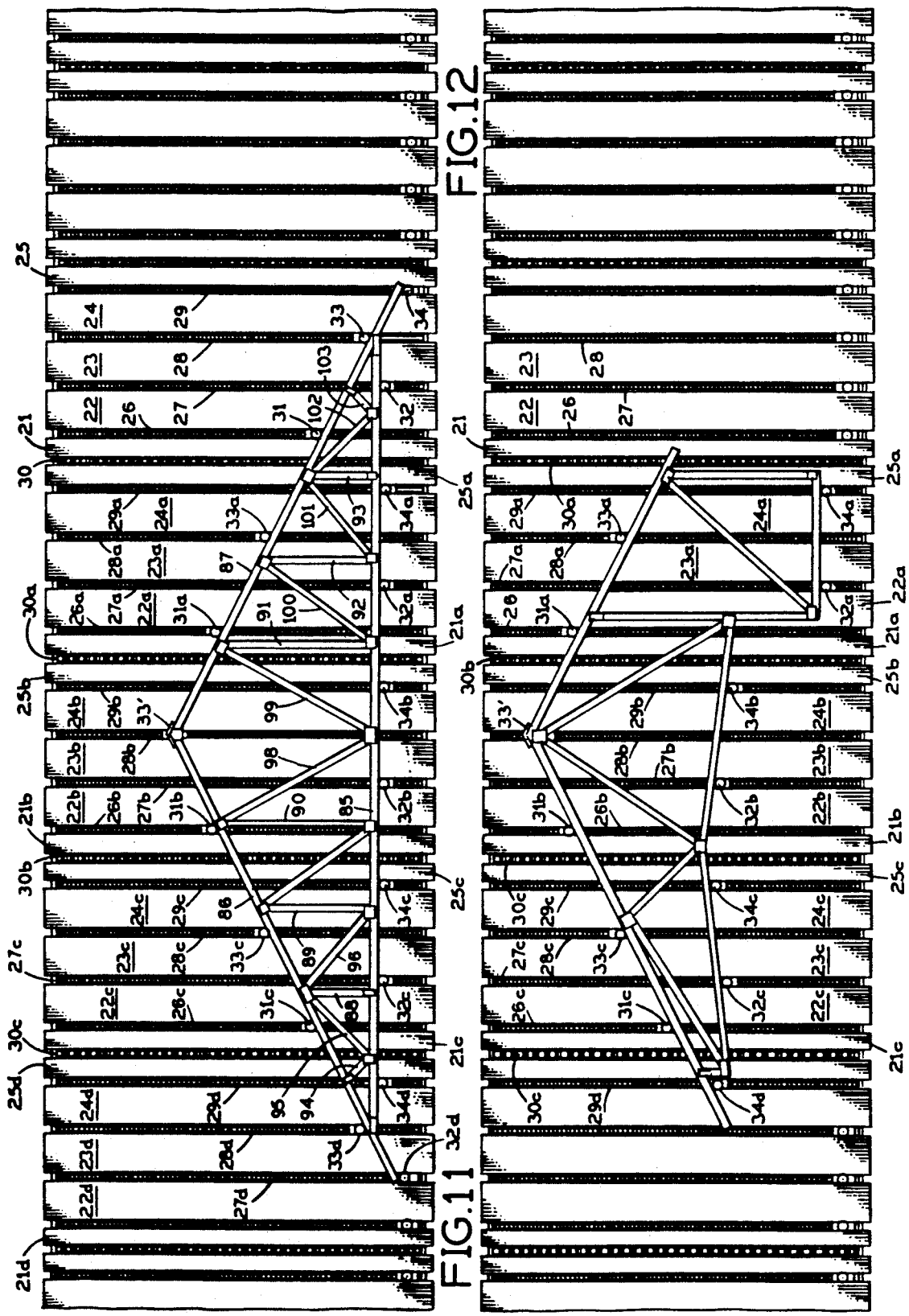

APPARATUS FOR ASSEMBLY OF WOOD STRUCTURES

The invention relates to an apparatus for assembling wood structures, in particular wood trusses, as used in wood construction.

BACKGROUND AND PRIOR ART

The introduction of prefabricated wood trusses has made modern construction faster and more efficient. The wood trusses are assembled in factories equipped with machinery for mass-fabricating the individual truss components, which are assembled on large assembly tables, before they are shipped to the construction sites. According to the conventional art the most time-consuming part of truss fabrication is the assembly process.

Inventors have in the past shown various types of jigs and/or mechanized assembly tables to facilitate the assembly of the wood trusses.

U.S. Pat. No. 2,212,421 shows an assembly table for wood structures having a table surface equipped for receiving templates at preselected locations, which in turn serve to position the truss components on the table before securing the joints of the truss with ready-made metal connectors. U.S. Pat. No. 3,068,484 shows an apparatus for fabricating wood structures, which includes clamping of the truss parts in a fixture before inserting the metal connectors. U.S. Pat. No. 4,567,821 shows an apparatus for assembling wooden trusses, which includes a frame supporting a clamp table with an adjustable grid that holds the truss components in place before securing the truss joints.

The devices according to the prior art, however, all suffer from the drawback that the erection or preparing of the assembly jig before truss fabrication can begin is cumbersome and time consuming. It is accordingly an object of the instant invention to provide a truss assembly apparatus that automatically, under control of a computer program, sets a plurality of jig stops in an assembly table, which overcomes the drawbacks of the known apparatus and jigs for truss assembly.

SUMMARY OF THE INVENTION

According to the instant invention, there is provided a truss assembly jig, which includes an assembly table composed of similar table sections, wherein each table section in turn includes a plurality of table panels, wherein the table sections are spaced apart by relatively wide elongated openings and the table panels are spaced apart by relatively narrow elongated openings, a plurality of laterally movable jig stops, each movable in a respective narrow elongated opening by means of jig positioning components mounted under the table surface, and jig stop control means coupled to the jig stop positioning components and connected to an electronic control circuit which has an electronic control with a data memory for storing position data for the jig stops.

The assembly jig positioning components may further include a lead screw for each jig stop which is threadedly connected with the jig stop and driven by a respective reversible controllable motor, advantageously a stepper motor, which can be controlled precisely by the jig stop positioning apparatus to move the jig stop precisely to a position determined by the jig stop position data.

In accordance with a further feature, there is provided a fixedly positioned home jig stop switch which is activated whenever the stepper motor is operated to drive the jig stop back to its home position. The home jig stop switch is connected to the electronic control to stop the motor when the jig stop is all the way back to its home position.

Feedback means may be provided which are coupled to each jig stop and connected to the electronic control for feeding back the position of each jig stop, so that the electronic control can monitor the position of each jig stop at all times to insure that the jig stop is in its proper position, according to the jig stop data.

As a further feature, there is provided a number of conveyor roller carriers positioned below the wider elongate table openings in parallel alignment therewith, and lifting apparatus coupled to the roller carriers which operate to lift the roller carriers to a level above the assembly table, under control of the electronic control, so that the assembled and completed truss can be slid off the assembly table on the conveyor roller. The lifting apparatus is advantageously provided with hydraulic or air-operated cylinders for lifting the truss under control of the electronic control via an intermediate control valve.

In accordance with a still further feature the assembly jig is provided with a gantry at one end of the assembly table which has an impression roller driven by a roller motor, also under control of the electronic control, which served to impress metal connector plates into the truss joints as it rolls across the assembled truss structure.

Further objects and advantages of this invention will be apparent from the following detailed description of a presently preferred embodiment which is illustrated schematically in the accompanying drawings.

DESCRIPTION OF THE DRAWINGS

FIG. 2 is a partial front elevation taken from the line 2—2 in FIG. 1;

FIG. 3 is a vertical cross-section taken along the line 3—3 in FIG. 1, with parts broken away;

FIG. 4 is a vertical cross-section taken along the line 4—4 in FIG. 1, with parts broken away;

FIG. 5 is a fragmentary front elevation taken along the line 5—5 in FIG. 4;

FIG. 6 is a fragmentary vertical longitudinal section taken along the line 6—6 in FIG. 4;

FIG. 7 is a vertical cross-section taken along the line 7—7 in FIG. 1, with the conveyor rollers in their normal lowered position;

FIG. 8 is a fragmentary horizontal longitudinal section taken along the line 8—8 in FIG. 7;

FIG. 9 is a fragmentary vertical longitudinal section taken along the line 9—9 in FIG. 7;

FIG. 10 is a view like FIG. 8 but showing the conveyor rollers raised to a position permitting the assembled truss to be slid off onto another conveyor behind the truss assembly table;

FIG. 11 is a top plan view of the present jigging system with its jig stops positioned for fabricating a wood truss of one design;

FIG. 12 is a top plan view of the same jigging system with its jig stops positioned for fabricating a wood truss of a second design;

FIG. 13 is a fragmentary perspective view showing how a typical pronged metal connector is embedded in adjoining pieces of a wood truss;

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
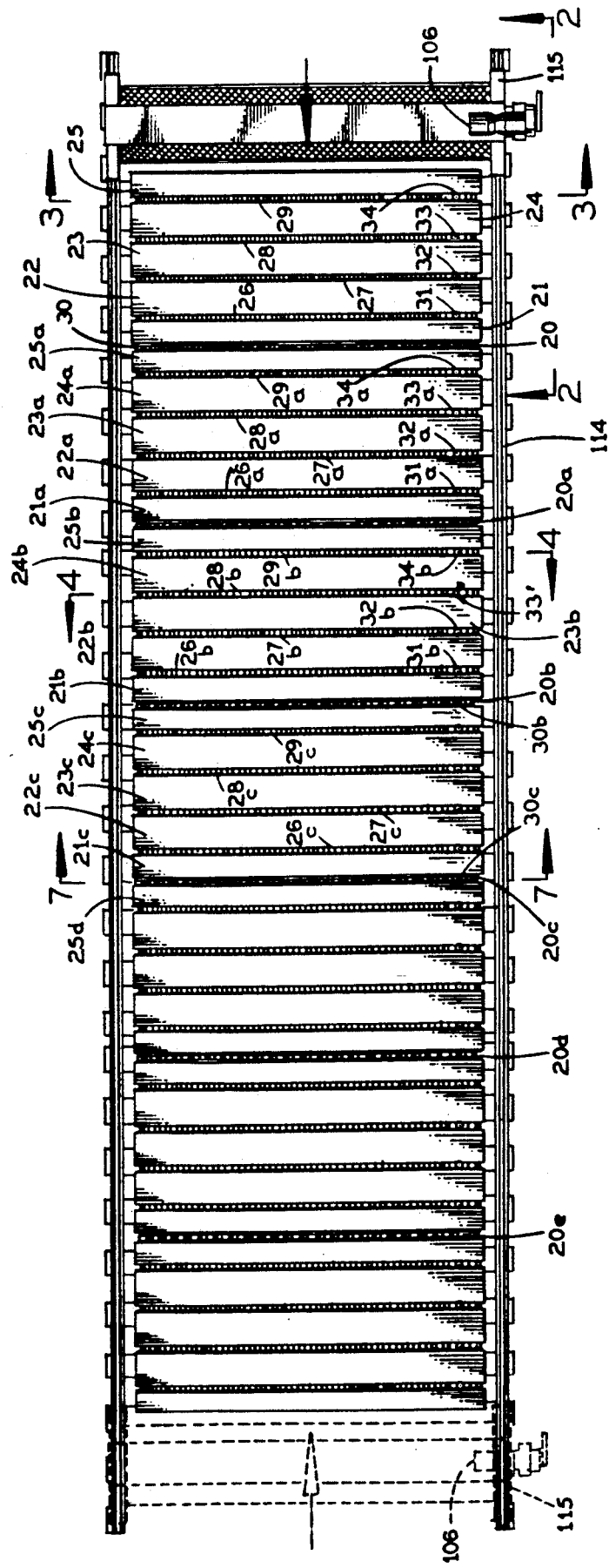
FIG. 1 is a top plan view of a truss assembly table with an automatic, computer-controlled setup jigging system in accordance with the present invention.

Referring first to FIG. 1, the present system has a truss assembly table which is elongated from left to right in this Figure. The table has several sections arranged end to end and separated by elongated openings 20, 20a, 20b, 20c, 20d and 20e, each of which extends from front to back across the table. To the right of opening 20, the table section has a series of flat horizontal panels 21, 22, 23, 24 and 25 separated by elongated opening 26, 27, 28 and 29, which are narrower than the openings 20, 20a, etc. between the table sections. In this table section the panels 21 and 25 at its opposite ends are substantially narrower than the panels 22, 23 and 24 between them.

The panels and the openings in the table section to the right of the opening 20a are given the same reference numerals, but with an "a"suffix added, as those of the table section to the right of opening 20. This is also true for each of the other table sections, but with the corresponding letter suffix added to the reference numeral for each panel or opening in the table section.

A jack or lift 30 (FIG. 2) is vertically displaceable in the opening 20 between the two table sections near the right end in FIG. 1. Similarly, the other openings 20b, 20c, 20d and 20e between neighboring sections of the table receive respective vertically displaceable jacks or lifts 30a, 30b, 30c, 30d and 30e. The construction and mode of operation of each of these jacks or lifts is described in detail hereinafter with reference to FIGS. 7–10.

The opening 26 (FIG. 1) in the right-hand table section between table panels 21 and 22 slidably receives a jig stop 31, which is selectively adjustable along this opening, as described hereinafter. Similarly, a jig stop 32 is slidably adjustable along the next opening 27 to the right, a jig stop 33 is slidably adjustable along the opening 28, and a jig stop 34 is slidably adjustable along the opening 29 in this section of the table.

With one exception, each of the other table sections has four slidably adjustable jig stops, similarly numbered 31, 32, 33 and 34 and with the letter suffix (a, b, c, etc.) of that table section added. Each jig stop is a roller rotatably mounted on a short vertical shaft and having a cylindrical periphery except at the top and bottom where it is beveled.

The table section whose panels have the suffix "b" has just three roller-type jig stops 31b, 32b and 34b at the openings 26b, 27b and 29b between the panels of this table section. At the remaining opening 28b in this section of the table, a special jig stop 33' is positioned for engagement with the peak of the truss, as explained hereinafter.

Each table section is supported from below by a rigid frame. As shown in FIGS. 2 and 3, the support frame for the table section closest to the right end of the truss assembly table has a horizontal base 35 supported above the floor F by several vertical posts 36. The horizontal base 35 extends the full length of this section of the table (FIG. 2) and the full front-to-back depth of this section of the table (FIG. 3). As shown in FIG. 2, table section 21 rests on a pair of support beams 37 and 38 which extends up from base 35. Table section 22 rests on a pair of support beams 39 and 40 which extend up from base 35. Table section 23 rests on a pair of support beams 41 and 42 which extend up from base 35. Table section 24 rests on a pair of support beams 43 and 44 which extend up from base 35. Table section 25 rests on a support beam 43 and 44 which extends up from base 35.

Support beams 44 and 45 support between them a flat vertical plate 46. As shown in FIG. 3, a reversible electric motor 47 is mounted on the back side of plate 46 and it drives a gear 48 at the front of this plate. Gear 48 drives and endless flexible chain 49 which drives a gear 50 above. Gear 50 is attached to a lead screw 51 extending horizontally below the opening 29 from the front side of the table to its back side. The lead screw is rotatably supported at its opposite ends by an anti-friction bearing 52 on the back of support plate 46 and an anti-friction bearing 53 on a vertical support plate 54 extending between and supported by support beams 44 and 45 on the back side of the table. A jig stop carrier 55 threadedly engages lead screw 51 and supports from below the jig stop 34 which is located in the opening 29 between panels 24 and 25 of this section of the table.

With this arrangement, the reversible motor 47 can move the jig stop 34 in either direction along the opening 29 to any desired position in a front-to-back direction across the truss assembly table.

Each of the other jig stops 31, 32 and 33 at this table section is selectively positionable along the corresponding opening 26, 27 or 28 by a similar lead screw driven individually by a corresponding reversible electric motor. For example, referring to FIG. 2, jig stop 31 is positioned by a lead screw connected to a gear 56 driven by an endless flexible chain 57 that is driven by a gear 58. Gear 58 is driven by a reversible electric motor supported by a vertical plate 59 which extends between support beams 38 and 39 and is supported by them.

At each of the other table sections the four jig stops numbered 31, 32. 33 and 34, with the appropriate letter suffix, are each individually adjustable along the respective openings in that table section numbered 26, 27, 28 and 29, with the corresponding letter suffix.

For example, as shown in FIG. 4, the jig stop 34b is on a carrier 55b which threadedly received a lead screw 51b driven by a reversible electric motor 47b through a pulley 48b (FIG. 5), endless flexible chain 49b and pulley 50b. As shown in FIGS. 1 and 6, the jig stop 34b is located directly above the opening 29b between table panels 24b and 25b.

FIG. 4 at the right side shows the special jig stop 33' for engaging the peak of the roof truss, as shown in FIG. 11 or FIG. 12. This jig stop 33' is bolted on top of a carrier 55' which threadedly receives a lead screw 51' driven individually by a motor through a chain drive like the one shown for the lead screw 51b in this Figure.

FIGS. 7, 8, 9 and 10 show the jack or lift located at the opening 20c in the table between the table sections with the "c" and "d" suffixes. This jack or lift has a horizontally elongated roller carrier 61 of channel-shaped cross-section (FIG. 9) with a flat horizontal bottom wall 62 extending between upstanding, vertical, opposite side walls 63 and 64. A plurality of cylindrical conveyor rollers 65 are rotatably supported individually by roller carrier 61, and they project up past the top edges of the side walls 63 and 64 of the roller carrier. Normally, as shown in FIGS. 7 and 9, the tops of the roller 65 are slightly below the level of the top surfaces of the table panels 21c and 25d on opposite sides of opening 39c. As shown in FIG. 10, the roller carrier 61 may be raised to a position in which the tops of rollers 65 are above the level of the tops of the jig stops (e.g., 20, 31, 32, etc.).

The roller carrier 61 is raised and lowered by an air cylinder 66 (FIG. 7) operating a reciprocable piston connected to a piston rod 67 which extends out slidably through the left end of cylinder 66 in FIG. 7. A rigid linkage arm 68 extends out from the piston rod and is pivotally connected at 69 to the lower end of a lever 70 which is bent to form an angle of about 135 degrees. At the bend in lever 70 it is pivotally mounted at 71 on a horizontally elongated, fixedly positioned, support block 72. At its left end in FIG. 7 the lever 70 is pivotally connected at 73 to a pair of ears 74 and 75 (FIG. 9) which extend down from the roller carrier 61. The opposite end of the air cylinder 66 from its piston rod 67 is pivoted at 76 to fixed support block 77. To the right of the air cylinder 66 in FIG. 7, a straight linkage arm 78 is pivoted at its left end, at 79, to a pair of ears 80 and 81 extending down from roller carrier 61 and is pivoted at its right end at 82, to a fixed support block 83.

FIG. 7 shows the normal position of the parts, in which the piston rod 67 is retracted, holding the remote end of lever 70 (at pivot 73) down to position the tops of the conveyor rollers 65 below the top surface of the table.

FIG. 10 shows the position of the parts as a result of the introduction of pressurized air into the right end of cylinder 66, which causes piston rod 67 to move out to an extended position, rocking lever 70 clockwise and raising its end at 73 to push the roller carrier 61 up to a position in which the tops of the conveyor rollers 65 are above the level of the tops of all the jig stops, e.g., 30, 31, 32, etc., including the V-shaped special jig stop 33'.

The jack or lift at each of the other openings 20, 20a, 20b, 20d and 20e between the neighboring sections of the table is identical to the one just described.

FIG. 11 shows how the jig stops in the present system are positioned to engage the outside of a truss of known design, which has a cross beam 85 and a pair of oppositely inclined beams 86 and 87 extending in from opposite ends of the cross beam 85 and adjoining each other at the inner end of each and forming a V. Each inclined beam 86 and 87 also extends a short distance beyond the adjacent end of the cross beam 85. The truss also has a series of straight, parallel pieces 88, 89 and 90 on the inside, which extend perpendicularly from cross beam 85 to one inclined beam 86, and a series of straight, parallel pieces 91, 92, and 93 on the inside, which extend from the cross beam 85 to the other inclined beam 87. The truss also has diagonal members on the inside, numbered 94, 95, 96, 97, 98, 99, 100, 101, 102 and 103 from left to right in FIG. 11.

As shown in FIG. 11, before being attached to each other, the pieces of the truss are fitted together as they will be after they are attached to each other. From left to right in this Figure, the cross beam 85 of the truss is engaged on the outside by the roller-type jig stops 34d, 32c, 34c, 32b, 34b, 32a, 34a and 32. The inclined beam 86 of the truss on the left side of FIG. 11 is engaged on the outside by the roller-type jig stops 33d, 31c, 33c and 31b. The oppositely inclined beam 87 of the truss is engaged on the outside by the roller-type jig stops 31a, 33a, 31 and 33. The special V-shaped jig stop 33' engages the inclined beams 86 and 87 where they adjoin each other. At the extreme left end of the truss in FIG. 11, the overhanging end of the inclined beam 86 is engaged by the roller-type jig stop 32d on what will be the lower face of this truss when it is in place on a building. Similarly, a roller-type jig stop 34 engages the overhanging end of the other inclined beam 87 on what will be the lower face of this beam.

It will be apparent that the outside pieces of the truss are firmly held in place by the jig stops which engage the outside of the truss on opposite sides in alternate sequence from left to right across the truss. Thus, for example, jig stop 32c engages the truss on the outside of the cross beam 85, whereas the next jig stops 31c and 33c on opposite sides of jig stop 32c engage the truss on the outside of the inclined beam 86.

FIG. 12 shows the jig stops in the present system positioned to engage the outside of a truss of substantially different design from the truss shown in FIG. 11. The opposite sides of this truss are engaged by the jig stops in alternate sequence from left to right across the truss to hold the truss pieces in position with maximum security against accidental displacement.

The present system includes a gantry assembly of known design for forcing the usual metal connectors down into the wood truss pieces where they adjoin. Preferably, this gantry assembly is a "ROLL-A-MASTER" manufactured and sold by the assignee of the present invention.

As shown in FIGS. 2 and 3, this gantry assembly includes a large diameter horizontal roller 105 overlying the truss assembly table and an electric motor 106 driving the roller 105 through a belt 107 and a gear reduction 108.

At its right end in FIG. 3 the roller 105 carries a gear 109 which drives an endless flexible chain 110 that passes across an idler gear 111 and then around a lower gear 122 affixed to a drive wheel 113 that rolls along the top of a rail 114 on the floor of the building where the present truss assembly system is located. As shown in FIG. 1, rail 114 is at the front of the truss assembly table.

A similar drive arrangement is located at the opposite end of roller 105. Corresponding elements of this drive arrangement have the same reference numerals, with an "a" suffix added, as the elements of the drive arrangement at the right end of roller 105 in FIG. 3.

At its right end in FIG. 3 the housing or frame of the gantry assembly has a vertical outer wall 115, which at its opposite ends (FIG. 2) extends down outside the rail 114, and a vertical inner wall 116 (FIG. 3) which extends down inside this rail. The outer wall 115 rotatably supports four rollers 117, 118, 119 and 120 (FIG. 2) which extend into the longitudinal recess on the outside of rail 114 and engage the top surface of the bottom web of this rail, as shown in FIG. 3 for roller 117. The inner wall 116 rotatably supports four similar rollers, one of which is shown at 121 in FIG. 3, which similarly engage rail 114 at the inside.

Likewise, at the left end in FIG. 3 the housing or frame of the gantry assembly has outer and inner walls 115a and 116a, each of which rotatably supports four rollers that engage the rail 114a on opposite sides. One outside roller 117a and one inside roller 121a appear in FIG. 3.

When the motor 106 is on, it drives the drive wheels 113 and 113a, which roll along the top of the rails 114 and 114a, and the rollers carried by the outer and inner walls 115, 116, 115a and 116a at the opposite ends of the gantry assembly guide the gantry's movement along these rails. Motor 106 also rotates the roller 105, which presses the metal connectors down into the wood truss members to join them into a unitary, substantially rigid structure as the gantry assembly rolls along rails 114 and 114a and roller 105 passes over the truss assembly table.

Figure 14:
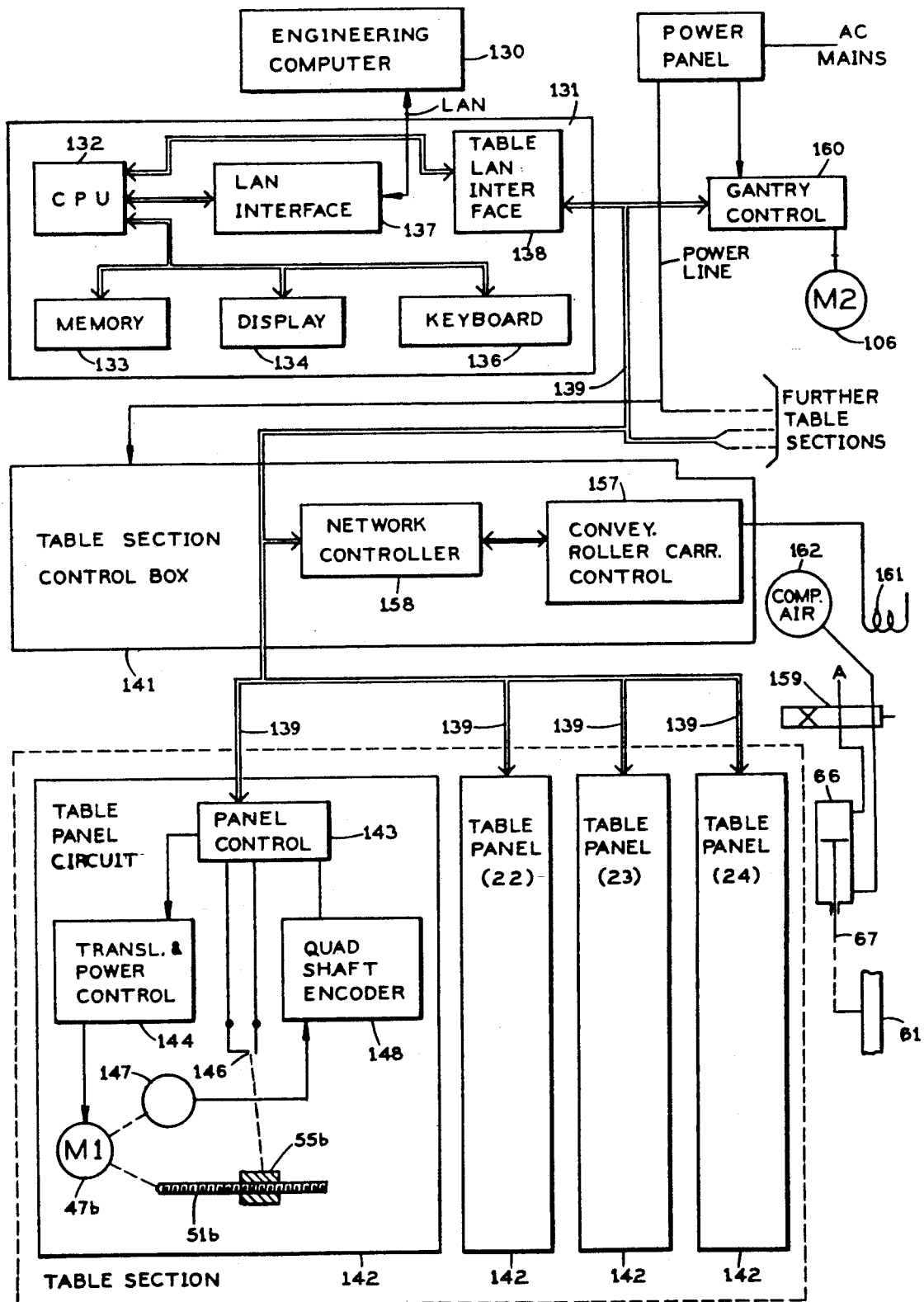
FIG. 14 is a block diagram of the electronic control apparatus, showing the major components thereof.

In FIG. 14, an engineering computer 130 (which is not part of the instant invention) provides, on the basis of inputs from a customer's engineering drawings and specifications, an engineering design for a truss or other wood structure of planar construction. The engineering design includes precise position data for the plurality of jig stops, which, when positioned according to the data, define the exact positions of all components of the truss, as shown in FIGS. 11 and 12. The engineering computer is connected via a data connection LAN ("Local Area Network") or, alternatively, via manual data transfer with an electronic control circuit 131, which advantageously is a work station computer, having a central processing unit 132, a memory 133, a data display 134, a data entry keyboard 136, and a LAN interface 137. In the manual data transfer mode, a person reads the position data from a display or printout of the engineering computer and enters them manually into the electronic control circuit, e.g., via keyboard 136. The electronic control 131 receives the position data from the engineering computer 130 and stores them as jig stop position data in its memroy 133, when they are called from the keyboard 136, in preparation for starting the fabrication of a batch of wood trusses. These and other data can be monitored on the data display 134. The electronics control next sends the position data via a data bus 139, to a group of table section control boxes 141, of which one if provided for each of the table sections shown in FIG. 1. Each table control box 141 contains conventional circuits that enable the electronic control 131 to communicate with each of four table panel circuits 142. Each table panel circuit 142 is connected with a respective table panel (21-24). Each table panel circuit 142 serves to control the respective stepper motor 47 for that panel and is connected through data bus 139 to the electronic control 131 via the table section control box 141.

Figure 15:
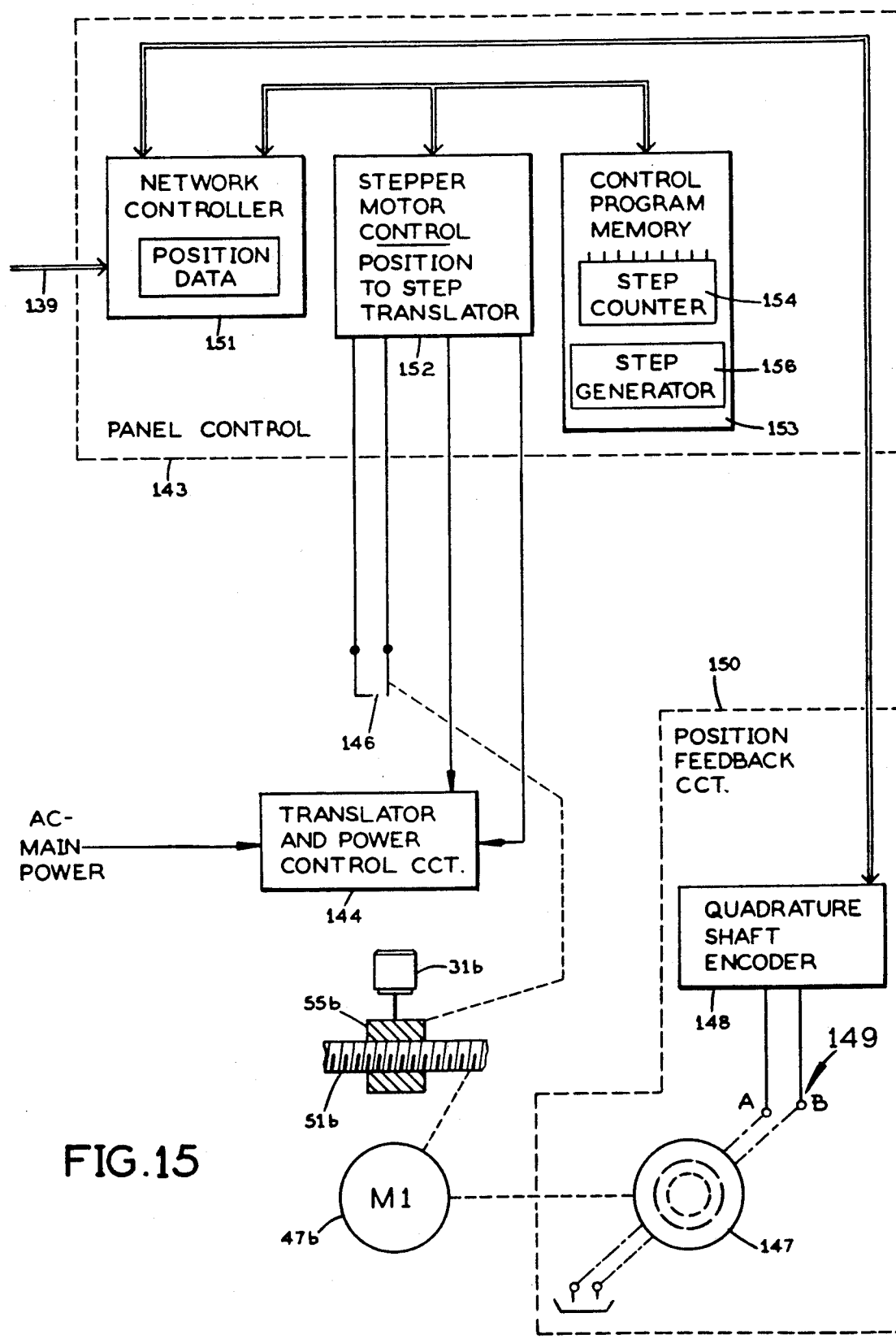
FIG. 15 is a more detailed block diagram of the panel control and the translator and power control blocks of FIG. 14.

The table panel circuit 142 includes a panel control 143, seen in more detail in FIG. 15, and a translator and power control 144. The panel control 143 is connected to a jig stop home switch 146 which is fixedly mounted under the assembly table, as seen in FIG. 4, such that when the jig stop (31-34) is driven all the way to its home position, shown in FIG. 1, switch 146 is activated and stops the stepper motor 47 when the jig stop carrier 55b engages the switch 146.

A position feedback arrangement in a position feedback circuit 150 may optionally be provided, which advantageously includes an optical quadrature shaft encoder in the form of a slotted disk 147 mechanically linked to the motor 47b. Two optical sensors 149 A and B generate two mutually phase-shifted output signals from the encoder a given number of pulses per revolution. These signals are generated by overlapping misaligned slots in the disk 147 attached to the motor shaft. These two signals are connected via a network controller 151 and data bus 139 to the electronic control 131. From the information provided in the signals, the rate of movement, direction and position of the jig stop carrier 55b can be determined. The panel control 143 further includes a stepper motor control circuit 152 which controls the operation of the stepper motor M1 in regard to its direction of rotation and the number of steps to be performed. The position-to-step translator translates the jig stop position data to the proper number of motor steps to be traversed by the motor M1. A control program memory circuit 153 cooperates with the stepper motor control 152 and contains a control program memory, a step counter 154 and a step generator 156, wherein the stepper motor M1 is driven a number of steps according to a step count entered into the step counter by the control program memory. A translator and power control circuit 144 supplies the necessary power to drive the stepper motor from the AC-power mains under control of the stepper motor control circuit 152.

After the truss is assembled, a gantry control 160 (FIG. 14) connected to a gantry control motor 106(M2) is activated either by the electronic control 131 or manually in order to impress the metal connectors, seen in FIG. 13.

The table section control box 141 includes another network controller 158 connected to the data bus 139, which is connected to a conveyor roller carrier control 157, which is in turn connected to a fluid control valve 159 having an operating solenoid 161. The fluid control valve 159 controls compressed air from a compressed air source 162 to the air cylinder 66 having a piston connected by mechanical linkage 67, 68, 70, 72, 73, 74 to the roller carrier 61, as described above and shown in detail in FIG. 7. Upon actuation of the control valve 159 by the solenoid 161, the air cylinder 66 raises the roller carrier 61 to facilitate removal of the assembled truss from the truss assembly table.

Figure 16:
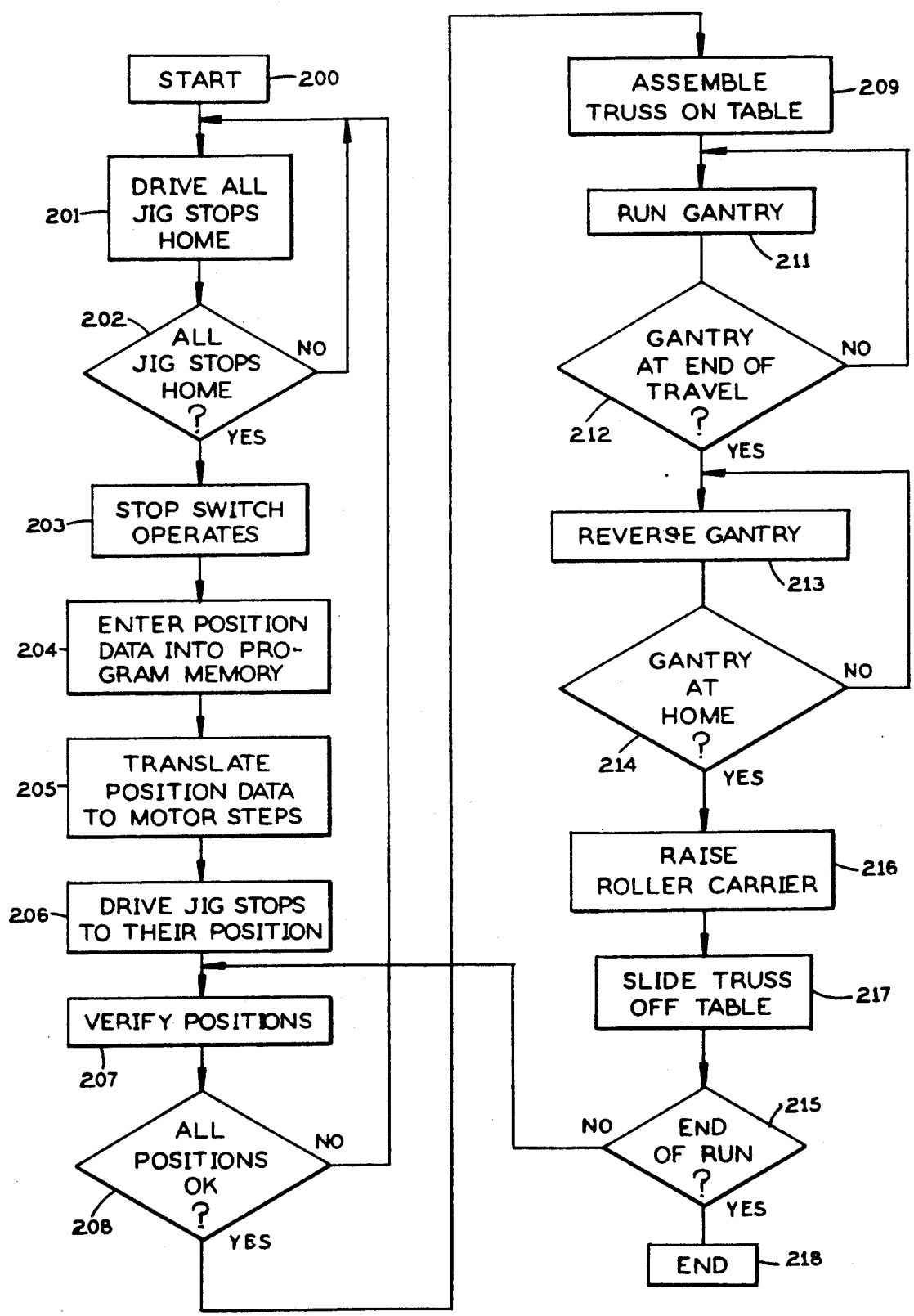
FIG. 16 is a flow chart showing the major steps of the operation of the invention.

FIG. 16 is a flow chart showing in more detail the operational steps of the invention, as described above. After start step 200, in which power is applied to all parts of the truss assembly jig and the control devices, and the control circuits are initialized and checked for operational status, first, all jig stops are driven in step 201 to their home position as seen in FIG. 1. In decision step 202, verification is made that all jig stops are actually in their position, as indicated by all home stop switches 146 being actuated, as shown in step 203. Next, the engineering computer 130 is instructed from the keyboard 136 to deliver jig position data, which are stored in the control program memory 153 in step 204. Next, the jig stop position data are translated in step 205 into the proper number of motor steps required to drive the stepper motor to its correct position on the assembly table (step 206). In optional steps 207 and 208 the positions of the jig stops are verified by means of the position feedback data from the position feedback circuit 150 wherein the actual feedback position data are compared with the jig stop position data in the control program memory. If the verification shows improper positioning, either an error indication is shown or a retry to step 201 is performed. If the verification shows proper positioning of the jig stops, the truss is assembled in step 209. After assembly, the gantry motor with roller 105 is run, driving the connector plates into the truss components (steps 211 and 212). At the end of the travel, the gantry roller is reversed to its home position in steps 212-214.

After the truss has been assembled and the gantry roller has returned, with the metal connectors pressed into the wood truss members where they adjoin one another, the air cylinder 66 (FIG. 7) for each jack or lift at the openings 30, 30a, 30b, etc. between neighboring sections of the table is actuated (step 216), so that all of these jacks move up to the position shown in FIG. 10, raising the tops of the conveyor rollers 65 above the level of the tops of the jig stops, e.g., 31, 32, 33, etc. Then a worker pushes the finished truss across these conveyor rollers (step 217) to another conveyor (not shown) on the back side of the table.

I claim:

1. A truss assembly apparatus comprising:
   an assembly table for supporting a plurality of truss members, said table having a top, a length and a width and having openings extending across the width of the table at intervals along the length of the table, said openings being parallel to each other and narrow in the direction of said length of the table;
   a plurality of lead screws extending across the width of the table along and below said openings;
   a plurality of jig stop carriers threadedly coupled individually to said lead screws and movable along said openings across the width of the table in response to rotation of the corresponding lead screws;
   a plurality of jig stops connected individually to said carriers and projecting above the top of the table at said openings for engagement with said truss members, said jig stops being adjustable to selected positions along said openings across the width of the table;
   a plurality of stepper motors driving said lead screws individually;
   means for storing position data designating individually the selected positions of said jig stops for a predetermined truss design;
   means for operating said stepper motors individually to move the respective jig stops to the positions along said openings across the width of the table designated by said position data;
   and means for stopping each of said stepper motors individually when the corresponding jig stop reaches the position across the width of the table designated by said position data.

2. A truss assembly table according to claim 20 wherein said means for stopping each of said stepper motors comprises:
   means operable in response to each of said stepper motors for producing an actual position signal which tells the actual position of the corresponding jig stop across the width of the table;
   means for comparing each of said actual position signals against said position data for the same jig stop;
   and means responsive to a match between said actual position signal for an individual jig stop and said position data for the same jig stop for turning off the corresponding stepper motor.

3. A truss assembly table according to claim 2 wherein:
   said means for storing position data includes a position-to-step translator for converting said position data for each jig stop to a corresponding number of steps for the respective stepper motor;
   and said means for producing said actual position signal for each jig stop includes a shaft encoder for producing a signal which tells the number of steps through which the respective stepper motor is driven.

4. A truss assembly table having a top, a length and a width, and comprising:
   a plurality of table sections in succession along the length of the table with openings between the sections extending across the width of the table, each of said table sections having a plurality of panels in succession lengthwise of the table separated by openings extending across the width of the table;
   a plurality of lead screws extending across the width of the table along and below the openings between said panels;
   a plurality of power operated means for individually rotating the lead screws;
   a plurality of jig stop carriers threadedly coupled individually to said lead screws and movable along said openings between said panels across the width of the table in response to rotation of the corresponding lead screws;
   a plurality of jig stops connected individually to said carriers and projecting above the top of the table above said openings between said panels, said jig stops being adjustable to selected positions along said openings across the width of the table;
   means for storing position data designating individually the selected positions of said jig stops for a predetermined truss design;
   means for operating said plurality of power-operated means individually to move the respective jig stops to the positions along said openings across the width of the table designated by said position data;
   means for stopping each of said plurality of power-operated means individually when the corresponding jig stop reaches the position across the width of the table designated by said position data;
   and a plurality of power-operated lifts at said openings between said table sections, said lifts being movable upward to raise a completed truss above the top of the jig stops.

5. A truss assembly table according to claim 4 wherein:
   each of said plurality of power-operated means for rotating the lead screws is a stepper motor;
   and said means for stopping each of said plurality of power-operated means comprises:
   means operable in response to each of said stepper motors for producing an actual position signal which tells the actual position of the corresponding jig stop across the width of the table;
   means for comparing each of said actual position signals against said position data for the same jig stop;
   and means responsive to a match between said actual position signal for an individual jig stop and said position data for the same jig stop for turning off the corresponding stepper motor.

6. A truss assembly table according to claim 5 wherein:

said means for storing position data includes a position-to-stop translator for converting said position data for each jig stop to a corresponding number of steps for the respective stepper motor;

and said means for producing said actual position signal for each jig stop includes a shaft encoder for producing a signal which tells the number of steps through which the respective stepper motor is driven.

* * * * *